US008602854B1

(12) United States Patent
Moore

(10) Patent No.: US 8,602,854 B1
(45) Date of Patent: Dec. 10, 2013

(54) APPARATUS AND METHODS FOR ACTIVE SCENT CONTROL IN HUNTING BLINDS

(76) Inventor: Keith Moore, Houston, TX (US)

(*) Notice: Subject to any disclaimer, the term of this patent is extended or adjusted under 35 U.S.C. 154(b) by 853 days.

(21) Appl. No.: 11/729,568

(22) Filed: Mar. 29, 2007

Related U.S. Application Data

(60) Provisional application No. 60/874,548, filed on Dec. 13, 2006.

(51) Int. Cl.
*E04H 15/02* (2006.01)
(52) U.S. Cl.
USPC .......................................................... 454/341
(58) Field of Classification Search
USPC .......................................................... 454/341
See application file for complete search history.

(56) References Cited

U.S. PATENT DOCUMENTS

| 5,259,816 | A | * | 11/1993 | Ke et al. ......................... 454/244 |
| 5,983,913 | A | * | 11/1999 | Fargason ......................... 135/93 |
| 6,537,535 | B1 | | 3/2003 | Williams |
| 6,942,065 | B1 | * | 9/2005 | Price ............................. 182/187 |
| 2004/0149329 | A1 | * | 8/2004 | Hess et al. ..................... 135/156 |
| 2006/0196439 | A1 | * | 9/2006 | Chilcoat ........................ 119/165 |
| 2007/0033854 | A1 | | 2/2007 | Ridge |
| 2007/0226868 | A1 | | 10/2007 | Hunt |
| 2008/0164098 | A1 | | 7/2008 | Groves et al. |

* cited by examiner

*Primary Examiner* — Steven B. McAllister
*Assistant Examiner* — Samantha Miller
(74) *Attorney, Agent, or Firm* — Thompson & Knight LLP; James J. Murphy

(57) ABSTRACT

A scent control system for use in a hunting blind enclosure includes an exhaust conduit adapted to exhaust air from the hunting blind enclosure and an air driver in fluid communication with the exhaust conduit. The air driver is operable to intake air from within the enclosure and exhaust air through the exhaust conduit and is further adapted to provide a negative air pressure within the enclosure relative to an air pressure outside of the enclosure. A filter disposed between an outlet of the air driver and the exhaust conduit filters human scent from air being exhausted from the enclosure.

15 Claims, 3 Drawing Sheets

APPARATUS AND METHODS FOR ACTIVE SCENT CONTROL IN HUNTING BLINDS

CROSS-REFERENCE TO RELATED APPLICATION

The present application claims priority to Provisional Patent Application Ser. No. 60/874,548, filed Dec. 13, 2006.

FIELD OF INVENTION

The present invention relates in general to hunting equipment and techniques, and in particular, to apparatus and methods for active scent control in hunting blinds.

BACKGROUND OF INVENTION

Hunting, for everything from small game, such as rabbits and birds, to large game, such as deer, bear, and elk, is a traditional and popular pastime worldwide. Generally, a hunter must contend with animal defenses based on three primary senses: hearing, sight, and smell. Over time, relatively sophisticated equipment and techniques have been developed to counter these defenses. Nevertheless, there remains significant room for improvement.

For example, a hunter can defeat the hearing defense simply by moving quietly and/or remaining still. Similarly, countering an animal's sight defense may be as easy as wearing camouflaged clothing or concealing oneself in a blind or similar structure. However, an animal's smell defense is more difficult to defeat, since human scent is virtually invisible, easily airborne transmitted, and generally hard to control. Among other things, even the most well constructed hunting blind will allow human scent to permeate through the seams along the edges of its enclosure, as well as through the gaps around the windows and doors. Moreover, the human scent escaping from a blind is more often than not at a significantly higher concentration than that emanating from individual hunters out in the open field.

Hence, given the popularity of hunting in general, apparatus and methods that will minimize the transmission of human scent would be quite useful and should find a wide acceptance in the hunting community.

SUMMARY OF INVENTION

The principles of the present invention are embodied in systems and methods that actively control the dispersion of human scent from a hunting blind or similar enclosure. According to one representative embodiment of these principles, a scent control system is disclosed for use in a hunting blind enclosure, which includes an exhaust conduit adapted to exhaust air from the hunting blind enclosure and an air driver in fluid communication with the exhaust conduit. The air driver intakes air from within the enclosure and exhausts air through the exhaust conduit. The air driver is also adapted to provide a negative air pressure within the enclosure relative to the air pressure outside of the enclosure. A filter disposed between an outlet of the air driver and the exhaust conduit filters human scent from air being exhausted from the enclosure.

Embodiments of the present principles realize substantial advantages. Among other things, these principles provide an active system that efficiently removes human scent generated by humans within the enclosure of a hunting blind. In particular, though a combination of filtering and negative enclosure-internal air pressure, the majority of the air flowing out of the enclosure is substantially filtered of human scent. Furthermore, the system can implement re-circulation capability, which continuously filters the air within the blind, as well as bathes the occupants with filtered air that helps move scent through the filter as it is secreted.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1-4 of the drawings, in which like numbers designate like parts.

Figure 1A:
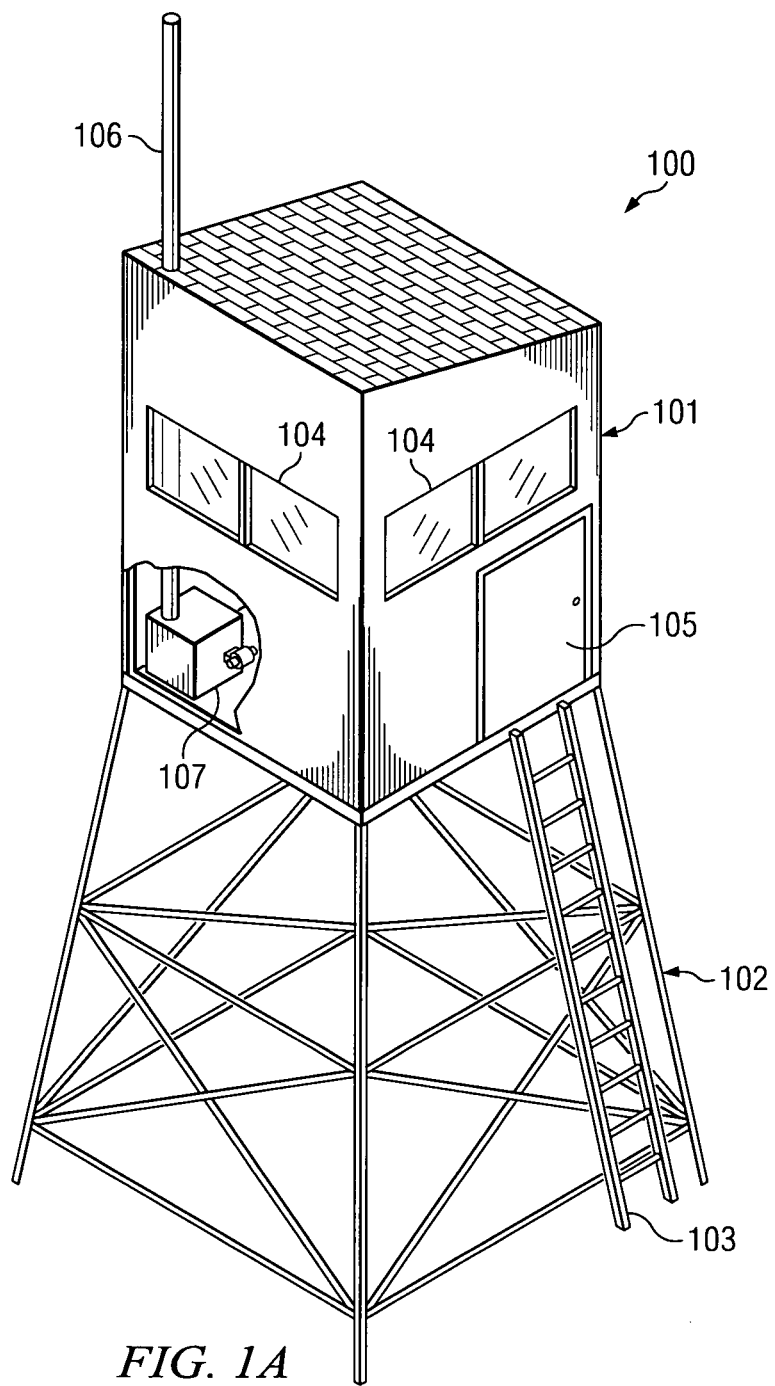
FIG. 1A is a diagram providing a perspective view of an exemplary hunting blind suitable for describing a typical application of the principles of the present invention.

FIG. 1A is a diagram of an exemplary hunting blind 100 suitable for describing a typical application of the principles of the present invention. Hunting blind 100 is only one example of a wide number of different types of hunting blinds, to which these principles may advantageously be applied.

In the illustrated embodiment, hunting blind 100 includes an enclosure 101, which could be constructed, for example, from such materials as wood, fiberglass, cloth, canvas, cardboard, or the like. Enclosure 101 is elevated by a frame 102 and is accessible by an associated ladder 103. In alternate embodiments, enclosure 101 could rest on the ground or sit on a trailer or other transport vehicle. Enclosure 101 could also be collapsible, either in whole or in part, to provide portability. In the illustrated embodiment, enclosure 101 also includes a set of windows 104, allowing hunters within to view approaching game, as well as a door 105 providing for hunter entry and exit.

Most hunting blinds currently on the market suffer from at least two significant problems. First, even a reasonably airtight conventional blind still allows human scent-tainted air to escape, especially since the air pressure inside the blind remains at just about the same air pressure as that on the outside. Second, most currently available hunting blinds to do not include an active air filtering system that filters at least some of the air flowing or leaking out of the confines of the blind itself. (Instead, hunters, both within and outside of a blind, may wear scent inhibiting clothing, which is often bulky and/or uncomfortable. Additionally, scent inhibiting clothing is not completely effective, since it does not control scent carried by human breath nor inhibit transmission of scent from materials adhering to the clothing outer surfaces.)

As is discussed in detail further below, the principles of the present invention address both of these significant problems of existing hunting blinds. Advantageously, an active filtering system is provided that includes a fan or blower and an active charcoal filter, which together filter air from the inside of a hunting blind and exhaust it to the outside. The fan or blower also creates a negative air differential on the inside of the blind with respect to the outside environment. Consequently, clean air from outside the blind is pulled in through the seams and gaps in the blind structure, while at the same time, unfiltered air from the inside of the blind is prevented from escaping from those same seams and gaps. In some embodiments, the active filter system additionally includes a flow-back tube for re-circulating filtered air within the blind.

While the principles of the present invention are being described using a hard-sided (i.e. rigid) enclosure 101, they are equally applicable to hunting enclosures including soft sides. For example, "pop-up" hunting enclosures are tent-like structures almost entirely made of a flexible material, such as cloth. Soft-sided enclosures have the significant advantage of being easily portable; however, disadvantageously, they allow wind to pass through them, which allows human scent to be carried into the surrounding environment. Even in soft-sided enclosures, which can be hard to seal, an active filtering system that discharges human-scented air from the enclosure and/or maintains a negative internal pressure relative to the outside, can provide significant benefits.

According to the principles of the present invention, enclosure 101 is provided with an air discharge tube (pipe) 106 and an active scent control system module 107. Generally, active scent control system module 107 takes air from the interior of enclosure, filters that air, and then discharges the filtered air through discharge tube 106. Active scent control system module 107 also maintains a negative pressure differential within enclosure 101 relative to the outside, thereby drawing air through the seams and openings of enclosure 101, such as those normally found around the edges of windows 104, and along the edges of the enclosure where the walls, floor, and/or roof meet. In some embodiments, active scent system module 107 also re-circulates filtered air within enclosure 107, as discussed further below. Generally, the higher conduit 106 extends above enclosure 101 the better, since a higher discharge point allows any residual scent in the discharged air to more completely dissipate before reaching the level of the game.

Figure 1B:
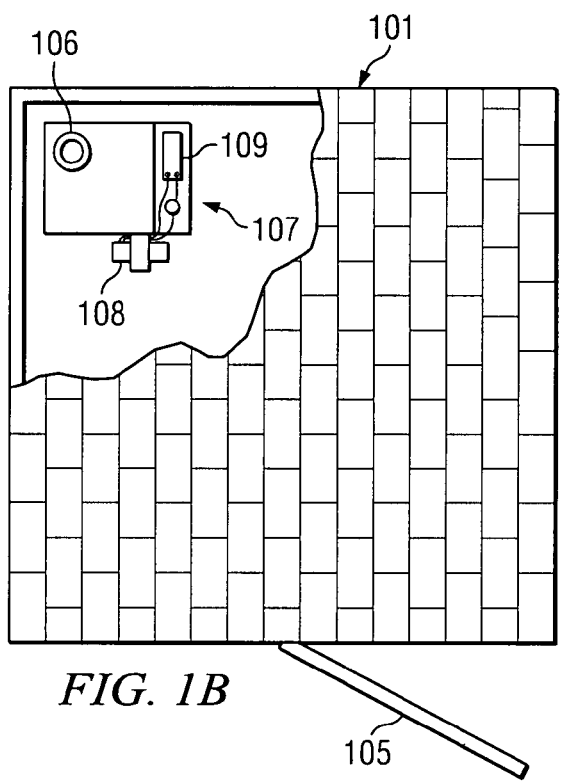
FIG. 1B is a top view of the hunting blind of FIG. 1B, a portion of which is cut-away to show an exemplary active scent control system embodying the principles of the present invention disposed therein.

As shown in FIG. 1B, active scent control system module 107 is disposed on the floor within a corner of enclosure 101, in order to provide maximum room for the hunter or hunters occupying blind 100; however, active scent control system module 107 and discharge tube 106 could be disposed in other positions around the floor of enclosure 101. Furthermore, active scent control system modulator 107 could also be fastened to an enclosure wall on the inside of the enclosure roof, or disposed on a shelf or other support structure within enclosure 101. (Active scent control module 107 is preferably completely disposed within the confines of enclosure 101 to minimize outside noise, which could potentially be heard by the game.)

Advantageously, active scent control system module 107 does not have to be affixed or fastened to any particular portion of enclosure 101, but is instead designed to be portable, which is particularly useful for portable blind applications. Preferably, active scent control system module 107 is built and sold as a discrete unit, although it could also be provided as original equipment supplied with a given hunting blind.

As shown in FIG. 1B, the preferred embodiment of active scent control system module 107 includes a fan or blower 108 and a battery or other appropriate power source 109. Further details are provided in FIGS. 2A and 2B. In particular, fan/blower 108 discharges air taken in from the surrounding interior of enclosure 101 and discharges it into a chambered filtering system including a pair of screens 201a and 201b and filter 202. In the embodiment of FIGS. 1A-1B and 2A-2B, the filtered air is forced through a simple (straight) tube 106 and out of enclosure 101. A switch 203 controls the activation and deactivation of fan/blower 108.

Overall, active scent control system module 107 can be constructed of any one of a number of different materials, including wood, plastic, and fiberglass. Tube 106 can also be constructed from any one of a number of different materials, including metals, plastics, and fiberglass.

Fan/blower 108 can be one of a number of well-known commercially available DC and AC fans and blowers of various airflow ratings. The airflow rating for a given embodiment of the principles of the present invention will depend on such factors as the size of enclosure 101, the ability to create a sufficient negative air pressure differential within enclosure 101, the ability to create sufficient exhaust through exhaust pipe 106, and the ability to re-circulate air within enclosure 106, the dimensions of filter 202, quietness, to name only a few possible factors. Moreover, for a soft-sided embodiment of enclosure 101, a more powerful blower or fan is preferred to counteract wind influence and increased leakage of scented air. In turn, the power requirements (e.g. voltage and current) of fan/blower 108 will dictate the voltage and current ratings for battery 109. If an AC fan or blower is used, a DC to AC converter is also provided.

Figure 2A:
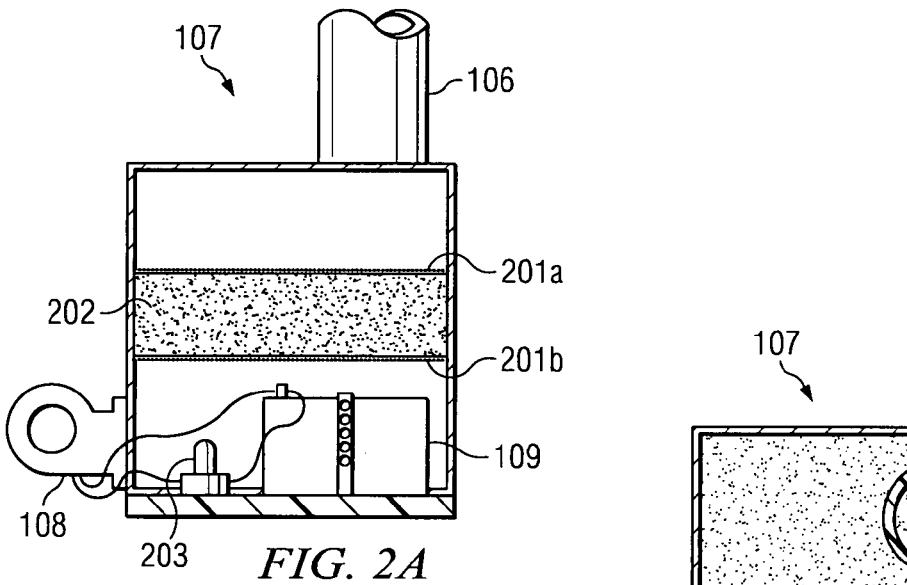
FIGS. 2A and 2B are respectively side and top view diagrams illustrating in further detail the active scent control system module shown in FIGS. 1A and 1B.
Figure 2B:
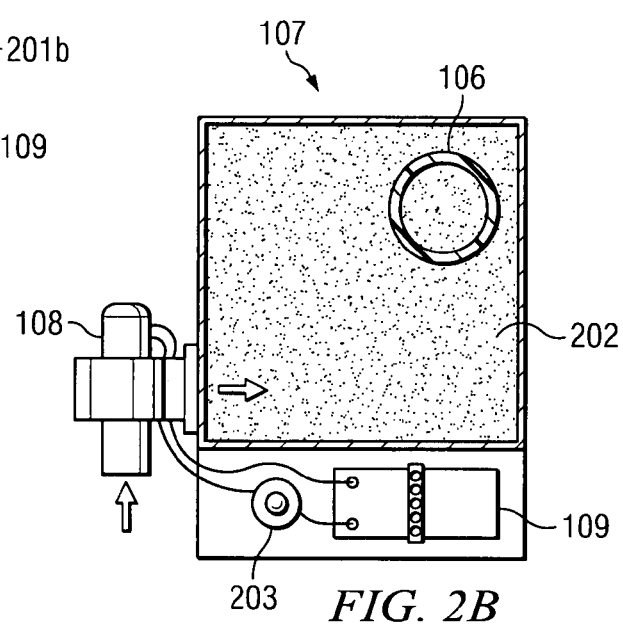

In the preferred embodiment, filter 202 is an active charcoal filter, although in alternate embodiments other types of absorbative and/or chemically reactive filters may be used, particularly those suitable for filtering volatile gases. A typical embodiment of activated charcoal air filter 202 may include a layer of activated charcoal disposed between two pieces of wire mesh or relatively fine metallic screening. In alternate embodiments, the activated charcoal may be disposed between aerosol filtering fiber layers, for removing particles such as condensate from human breadth, and/or fiber layer for filtering charcoal dust. As shown in FIGS. 2A and 2B, air is forced through filter 202 from the bottom of active scent control module 107 to the top. Alternatively, air can be drawn in and/or forced out through one or more of the sides of active scent control system module 107. In such embodiments, filter 202 would be vertically disposed adjacent to the sides of the module, to the same effect.

In the preferred embodiment, the airflow rate of fan/blower 108 and the dimensions of filter 202 are selected such that a given volume of air remains in contact with the activated charcoal for at least 0.2 seconds. Of course, a longer contact time could be used, but the ability to scrub-out human scent may be adversely impacted.

Figure 3:
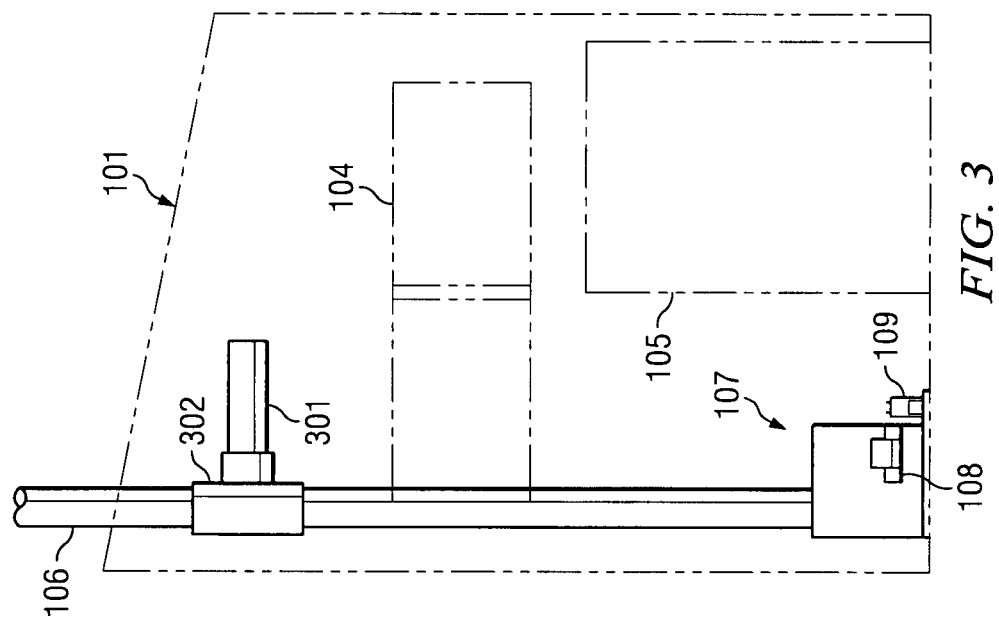
FIG. 3 is a side view diagram of a typical hunting blind including an alternate active scent control system embodying the principles of the present invention.

FIG. 3 is a diagram of an active scent control system according to an alternate embodiment of the principles of the present invention. In this example, tube 106 is fitted with a recirculation tube 301 and a tee 302. In the illustrated embodiment, the diameter of the portion of tube 106 below tee is approximately equal to the diameter of recirculation tube 301 while the portion of tube 106 above tee 302 is smaller in diameter. By selecting the diameter of the upper and lower portions of tube 106, as well as the diameter of re-circulating tube 301, the ratio of the amount of air discharged from enclosure 101 to the amount of air re-circulated within enclosure 101 is generally controlled. For example, if the diameters of the lower portion of tube 106 and re-circulating tube 301 are set at four inches (4") and the diameter of the upper portion of tube 106 is set at two inches (2"), then a given volume of air will nominally be re-circulated four (4) times within enclosure 101 prior to discharge to the outside. The same effect can be effectuated in alternate embodiments using a baffle or valve in or above tee 302.

Figure 4:
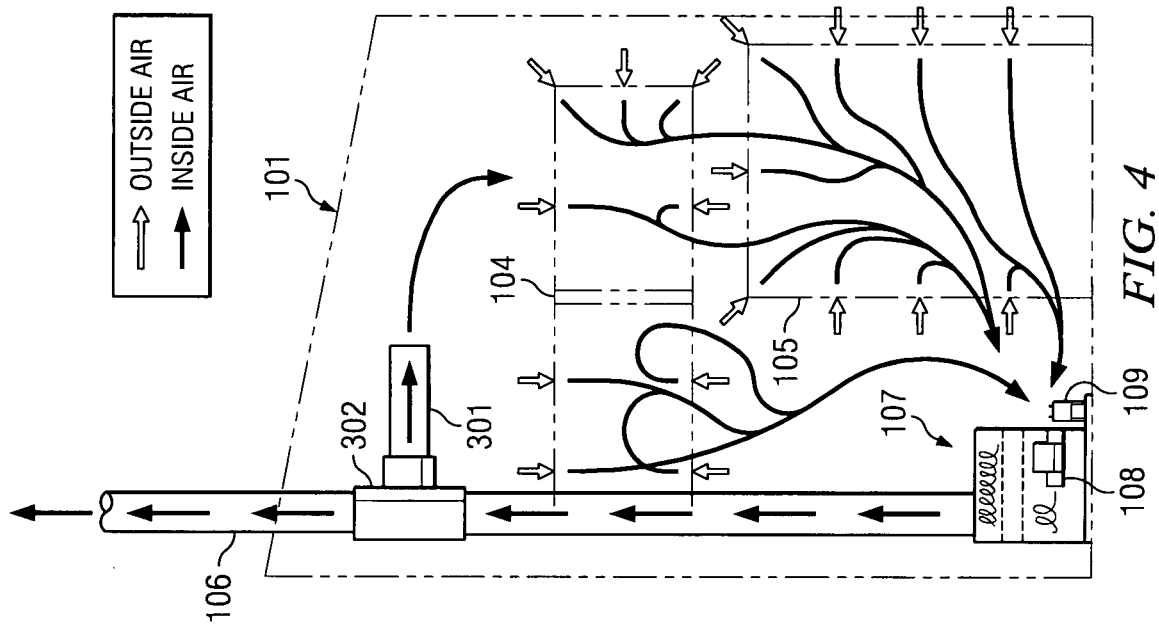
FIG. 4 is a side view diagram of the hunting blind of FIG. 3, which conceptually illustrates the air flow through the hunting blind during operation of the alternate active scent control system.

The air flow resulting from the application of the embodiment of FIG. 3 is conceptually illustrated in FIG. 4. Generally, a balance must be maintained to ensure that, even with re-circulation within enclosure 101, a negative pressure is maintained with respect to the outside environment. In this manner, as shown in FIG. 4, outside air flows into enclosure 101 through the various seams and gaps, while only filtered air is discharged back into the outside atmosphere. Furthermore, re-circulating tube 301 bathes the occupants of enclosure 101 with filtered air, which assists in removing scent from those occupants as it is secreted.

One significant advantage of establishing re-circulation is that the activated charcoal used in filter 202 can be reduced in surface area and/or in thickness, relative to the single pass-through embodiment of FIGS. 2A and 2B. In particular, the ability of filter 202 to remove scent from a given volume of air is a direct function of the amount of time that air comes in contact with the activated charcoal. Hence, if a given volume of air re-circulates within enclosure 101 five (5) times prior to discharge to the outside, the surface area or thickness of the activated charcoal within filter 202 can roughly be reduced by a factor of five (5) relative to the single pass-through embodiments. With a smaller filter, a smaller fan/blower 108 may be used.

In the illustrated embodiment, fan/blower 108 is a Marley Engineered Products Model 8090 venting fan using an AC motor that moves approximately ninety (90) scf of air at about 0.3 column inches of pressure. In this case, battery 109 is preferably a twelve (12) volt car battery and a one hundred fifty (150) watt DC to AC converter. This embodiment of fan/blower 108 will push approximately 70 sfc of air through a filter 202 that is approximately twelve (12) inches long, twelve (12) inches wide, and one (1) inch thick. If tee 302 has an input diameter of approximately four (4) inches, an output diameter of approximately two (2) inches, and a re-circulation diameter of approximately four (4) inches, approximately fourteen (14) scf will be output from enclosure 101 and approximately fifty-six (56) scf will be re-circulated, for a re-circulation to discharge ratio of about four (4) to one (1). In an enclosure 101 having dimensions of about four feet by four feet by six feet (4×4×6), and with relatively tight sealing, the inside air is completely refreshed roughly every eight (8) minutes.

It should be recognized that the general principles of the present invention can be modified, depending on the given application. For example, by increasing the extension of discharge tube 106 above the roof of enclosure 101, filter 202 may be reduced in size or even eliminated, if the discharged air is dispersed sufficiently above the game. Additionally, wind turbines or similar wind-driven devices could be used in place of fan/blower 108 to force air through active scent control system module 107. Finally, heat could additionally be applied to assist in destroying human scent within enclosure 101.

Applications of the principles of the present invention realize substantial advantages. Among other things, these principles provide an active system that efficiently removes human scent generated by humans within the enclosure of a hunting blind. In particular, though a combination of filtering and negative enclosure-internal air pressure, the majority of the air flowing out of the enclosure is substantially filtered of human scent. Furthermore, the system can implement re-circulation capability, which continuously filters the air within the blind, as well as bathes the occupants with filtered air that helps move scent through the filter as it is secreted.

Advantageously, active filter system modules embodying the inventive principles are relatively small and lightweight, and are therefore portable. They can also be built into blinds under construction, or be retrofitted into existing blinds. Additionally, hunters occupying a blind employing an active scent control system according to the principles of the present invention need not wear bulky scent inhibiting clothing or the like. (This is in addition to the fact that scent inhibiting clothing does not prevent the transmission of scent by human breath or address the problem of scent-bearing materials adhering to the outside of the clothing.) Finally, active scent control systems embodying the inventive principles can be constructed from a wide variety of different materials and use any one of a wide array of commercially available fans, blowers and batteries.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed:

1. A scent control system for use in hunting, comprising:
   a hunting blind enclosure including a roof and sidewalls defining an interior space for enclosing a human, at least one of the sidewalls including a door allowing ingress and egress of the human;
   an exhaust conduit extending through a selected one of the roof and sidewalls, the exhaust conduit including first and second elongated conduit sections and including an exhaust outlet at a distal end of the first conduit section for exhausting air from the hunting blind enclosure and a recirculation outlet disposed at a point between the first and second conduit sections within the hunting blind enclosure for re-circulating air within the hunting blind enclosure, wherein a ratio of a diameter of the first conduit and a diameter of at least one of the second conduit section and the recirculation outlet controls a ratio of an amount of air exhausted from the distal end of the first conduit section and an amount of air recirculated through the recirculation outlet, the amount of air recirculated being greater than the amount of air exhausted;
   an air driver in fluid communication with the second conduit section of the exhaust conduit and operable to intake air from within the enclosure and exhaust a portion of the air through the exhaust conduit exhaust outlet and another portion of the air through the exhaust conduit recirculation outlet, wherein the air driver is adapted to provide a negative air pressure within the enclosure relative to an air pressure outside of the enclosure when the door is closed; and a filter disposed between an outlet of the air driver and the exhaust conduit for filtering human scent from air being exhausted from the enclosure, the filter comprising a filtering material having a selected one of a surface area and a thickness inversely proportional to the amount of air recirculated.

2. The scent control system of claim 1, wherein the recirculation outlet comprises a re-circulation conduit in fluid communication with the exhaust conduit for re-circulating within the enclosure a selected amount of filtered air output from the filter.

3. The scent control system of claim 1, wherein the air driver is selected from the group consisting of fans and blowers.

4. The scent control system of claim 1, wherein the filtering material comprises activated charcoal.

5. The scent control system of claim 1, wherein the filter comprises:
- a chamber having an intake receiving air flow from the air driver and an outlet providing air flow to the exhaust conduit; and
- a filter disposed within the chamber between the intake and the outlet.

6. The scent control system of claim 1, wherein the air driver and filter are integrated into a module.

7. The scent control system of claim 6, wherein the module further comprises a power supply for powering the air driver.

8. A hunting blind comprising:
an enclosure, including a door;
an exhaust conduit extending beyond a selected outer surface of the enclosure and including first and second conduit sections with an exhaust outlet at a distal end of the first section for exhausting air from the enclosure and a recirculation outlet disposed at a point between the first and second conduit sections for re-circulating air within the enclosure, wherein a ratio of a diameter of the first conduit section and a diameter of at least one of the second conduit section and the recirculation outlet controls an amount of air exhausted from the enclosure and an amount of air recirculated within the enclosure, the amount of air recirculated being greater than the amount of air exhausted;
an air driver in fluid communication with the exhaust conduit and operable to intake air from within the enclosure and exhaust a portion of the air through the exhaust conduit exhaust outlet and another portion of the air through the exhaust conduit recirculation outlet, wherein the air driver is adapted to provide a negative air pressure within the enclosure relative to an air pressure outside of the enclosure when the door is closed; and
a filter disposed between an outlet of the air driver and the exhaust conduit for filtering human scent from air being exhausted from the enclosure, the filter comprising a filtering material having a selected one of a surface area and a thickness inversely proportional to the amount of air recirculated.

9. The hunting blind of claim 8, further comprising a re-circulator for re-circulating air within the enclosure.

10. The hunting blind of claim 8, wherein the enclosure is formed from at least one relatively rigid side panel.

11. The hunting blind of claim 8, wherein the filter comprises an activated charcoal filter.

12. The hunting blind of claim 8, wherein the exhaust conduit extends through an aperture formed in a roof of the enclosure.

13. A method of minimizing detection of a scent of a hunter by game comprising:
providing a hunting blind having a door;
intaking air from the interior of the hunting blind with an air driver;
driving the air from the interior of the hunting blind through a filtering material to filter-out human scent with the air driver;
exhausting a portion of the air after filtering from the hunting blind through an exhaust outlet of an exhaust conduit in fluid communication with the filter and the air driver, the exhaust conduit including a first section extending outward from the hunting blind such that the exhaust outlet is spaced from an outer surface of the hunting blind and a second section communicating with the air driver, wherein intaking air from the interior of the hunting blind and exhausting air from the hunting blind produces a negative air pressure within the hunting blind relative to an air pressure outside of the hunting blind when the door is closed; and
re-circulating another portion of the air after filtering within the hunting blind through a re-circulating outlet communicating with the exhaust conduit a point between the first and second sections of the exhaust conduit, wherein a ratio of a diameter of the first section and a diameter of at least one of the second section and the recirculation outlet in controls an amount of air exhausted from the hunting blind and an amount of air recirculated within the hunting blind, wherein the amount of air recirculated is greater than the amount of air exhausted and a selected one of a surface area and a thickness of the filtering material is inversely proportional to the amount of air recirculated.

14. The method of claim 13, further comprising re-circulating air within the hunting blind with the air driver.

15. The method of claim 13, wherein filtering comprises filtering with an activated charcoal filter.

* * * * *